April 9, 1946.  R. L. MALCOM  2,398,021
EYEGLASSES
Filed Dec. 22, 1943
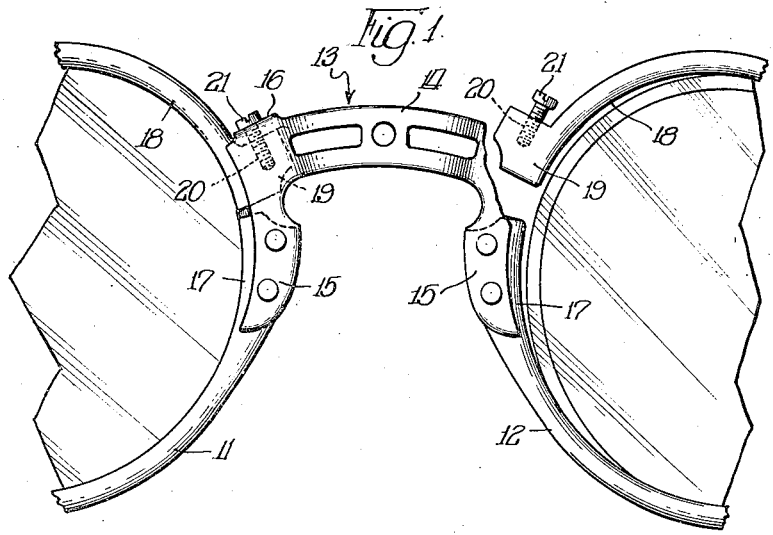
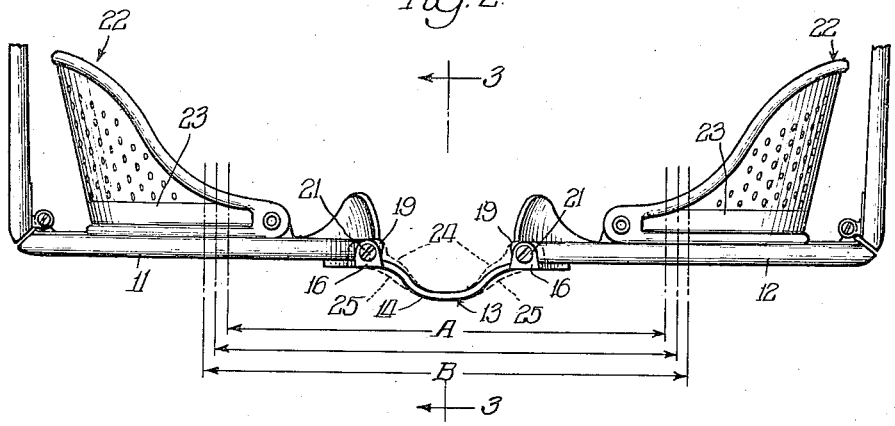
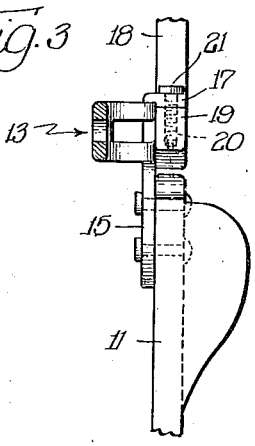
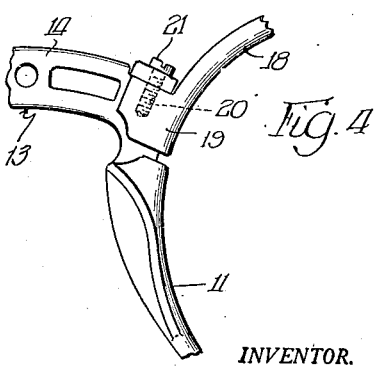
INVENTOR.
Robert L. Malcom,
BY
Cromwell, Greist & Warden
ATTYS Patented Apr. 9, 1946

2,398,021

UNITED STATES PATENT OFFICE 2,398,021

EYEGLASSES

Robert L. Malcom, Chicago, Ill., assignor to Chicago Eye Shield Company, Chicago, Ill., a corporation of Illinois Application December 22, 1943, Serial No. 515,261

2 Claims. (Cl. 88—41)

The present invention relates to improvements in eyeglasses. More particularly, it pertains to improvements in industrial eyeglasses which can be adjusted to vary the distances between the centers of the frames or lenses carried therein, and in which the frames can readily be separated by the wearers of such glasses to remove or replace such lenses.

Industrial eyeglasses are used primarily to protect the eyes of the wearer against the penetration of such foreign matter as abrasives, dust particles and the like. In grinding operations, for example, the particles flying in the direction of an operator's eyes are so numerous that the lenses of the industrial glasses are so quickly pitted and marred that after one or two days use they have to be reglazed or replaced entirely. Since plastic frames made of such material as cellulose acetate is conventionally stretched by heat to permit shrinking the same around the lenses, it will readily be appreciated that continuous replacement of the lenses becomes a costly and time consuming operation. Also, in order to accommodate the various head sizes of frames for different individuals and the distances between the centers of the pupils of the wearers' eyes, it has been customary to keep on hand large stocks of different sized frames.

A principal object of the present invention is the provision of an article of manufacture which comprises split eyeglass frames for lenses having an adjustable nose bridge connecting the split portions of each frame and means to open and close each split frame to permit removal and replacement of lenses.

More specifically, it is an object of the present invention to provide split flexible plastic eyeglass frames for lenses having an adjustable outwardly arched nose bridge connecting the frames which, upon changing the degree of the arch, permits the centers of the frames to be varied as desired, the nose bridge having depending portions connected to the lower portions of each split frame and means connected to upper portions of each split frame to open and close the frames to permit removal and replacement of lenses.

A further object of the invention is to provide split eyeglass frames for lenses with means associated therewith to open and close each frame to permit removal and replacement of lenses.

Still another object of the invention is the provision of a bridging piece connecting the eyeglass frames in which the bridging piece can readily be adjusted to increase or decrease the distance between centers of lenses carried by the frames.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawing, in which:

Fig. 1 is a front elevational view, with parts broken away and with parts disengaged, illustrating a preferred embodiment of the invention;

Fig. 2 is a top plan view of an article such as that illustrated in Fig. 1;

Fig. 3 is a transverse sectional view taken along the center line 3—3 of Fig. 2 and looking in the direction of the arrows; and Fig. 4 is a rear elevational view of Fig. 3.

Referring more particularly to the drawing, split eyeglass frames 11 and 12 are shown connected by a nose bridge member indicated generally at 13. It will be seen that the bridge is outwardly arched as indicated at 14 (Fig. 2). Depending portions 15, 15 appear at each end of the bridge. Above each depending portion are rearwardly projecting lugs 16, 16. The projections 15, 15 are secured in any suitable manner to lower portions 17, 17 of each split eyeglass frame and preferably remain fixed in this position. The opposite end of each split frame 18 terminates in a foot 19 having opening 20 therein. Each foot is adapted to be urged toward the opposing split portion 17, and underneath the lug 16, by means of a screw 21 passing through the lug and into the opening 20.

A lens can readily be removed or replaced from such an arrangement. The inner periphery of the frames are grooved to accommodate tapered portions of each lens. After a lens has been inserted in the groove, the opposing portions of the split frame are brought together and seated beneath the lug 16 and by tightening the screw therein, the lenses quickly become locked in position. By reversing these operations the lens is readily removable.

It will be seen that guards, such as indicated generally at 22, can be used in conjunction with the lenses to protect the eyes of the wearer from materials entering laterally thereof and behind the lens. Any suitable material, preferably plastic, which may be perforated, secured to a metallic strip, for example, such as indicated at 23, may be utilized for this purpose. The metallic strip can also be seated in each frame and removably secured into position together with the lens.

With respect to the bridge, it will be seen that there is quite a distinct outwardly arched portion as indicated at 14. Such a bridge preferably is made of a malleable material such as metal. As above indicated, there is a wide range of frame sizes necessary for industrial uses and it is bothersome and expensive to carry on hand a full stock of all sizes. By means of the present invention, however, a standard size frame can be used which can readily be adjusted at the factory to any size desired. This is accomplished by pressing the bridge piece against a suitable form to vary the degree of the arc. For example, as shown in Fig. 2 of the drawing, the solid lines indicate a standard size arch. If it is desired to bring the centers of the lenses closer together as indicated by the line A between lens or frame centers, the height of the bridge of the arch is increased which will draw the ends of the bridge closer together as indicated in the dotted position at 24, 24. On the other hand, if it is desired to vary the distance between centers by increasing the same as indicated by the line B between centers, the height of the arch is made smaller and the ends of the bridge will spread further apart as indicated in the dotted line positions 25, 25.

By means of the present invention, ophthalmic mountings generally can be simplified, and particularly is this true in connection with industrial mountings. A single frame can now immediately be changed into at least three major sizes simply by placing it in a forming tool and altering the height of the arch of the bridge. In this way a smaller supply of frames can be kept in stock. In addition to this, it is a distinct advantage to be able quickly to change the lenses themselves, for thus, unnecessary delay and expense are avoided.

It will thus be seen that the objects hereinbefore set forth may readily and efficiently be attained, and since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In an industrial eye shield having split lens holding portions for ready removal of said lenses, the improvement which comprises a malleable nose bridge outwardly arched from the lens holding portions and adapted for ready placement and adjustability in a template whereby the degree of arc can quickly be changed to regulate the distance between centers of lenses carried by said lens holding portions when pressure is brought to bear thereagainst, said bridge having openings therein readily to permit bendability thereof, depending portions extending from the ends of said bridge and each being secured to one end of the split lens holding portions, a rearwardly projecting lug at each top end of said bridge above said depending portion, each lug having an opening therein and overlying enlarged extensions at the other end of said split lens holding portion, each enlarged extension having screw threads and carrying a screw loosely mounted within the opening of each of said lugs whereby said enlarged portion, upon tightening said screws, is driven downwardly and away from said lug toward said lower lens holding portion thereby to tighten a lens upon replacement and firmly to hold the same locked in operative position.

2. In an industrial eye shield having split lens holding portions for ready removal of said lenses, the improvement which comprises a malleable nose bridge outwardly arched from the lens holding portions and adapted for ready placement and adjustment in a template whereby the degree of arc of said bridge can quickly be changed to regulate the distance between centers of lenses carried by said lens holding portions when pressure is brought to bear against said bridge, holding members at each end of said bridge and each being secured to one end of each split lens holding portion, a lug extending from said bridge opposite each holding member and overlying extensions at the other end of said split lens holding portion, the ends of each split lens holding portion being disposed adjacent each other between each lug and corresponding holding members, and means connecting each lug and its corresponding extension on said lens holding portion whereby the same can be tightened around each lens to affix it securely into position.

ROBERT L. MALCOM.